(12) United States Patent
Hauser et al.

(10) Patent No.: US 9,965,162 B2
(45) Date of Patent: May 8, 2018

(54) SCROLLING ACROSS BOUNDARIES IN A STRUCTURED DOCUMENT

(71) Applicant: Facebook, Inc., Menlo Park, CA (US)

(72) Inventors: Jasper Reid Hauser, San Francisco, CA (US); Jasleen Singh, Menlo Park, CA (US); Jonathan M. Kaldor, San Mateo, CA (US); William S. Bailey, San Francisco, CA (US); Vladimir Kolesnikov, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 35 days.

(21) Appl. No.: 13/689,622

(22) Filed: Nov. 29, 2012

(65) Prior Publication Data

US 2014/0149922 A1 May 29, 2014

(51) Int. Cl.
*G06F 3/0485* (2013.01)
*G06F 3/0488* (2013.01)

(52) U.S. Cl.
CPC .......... *G06F 3/0485* (2013.01); *G06F 3/0488* (2013.01)

(58) Field of Classification Search
CPC .............................. G06F 3/0488; G06F 3/0485
USPC ........................................................ 715/784
See application file for complete search history.

(56) References Cited

U.S. PATENT DOCUMENTS

| | | | | |
|---|---|---|---|---|
| 7,941,758 B2 * | 5/2011 | Tremblay | .............. | G06F 3/0481 345/169 |
| 8,429,557 B2 * | 4/2013 | Platzer | ................ | G06F 3/04845 345/169 |
| 2001/0037719 A1 * | 11/2001 | Gardner | ............... | G09B 15/023 84/478 |
| 2006/0048071 A1 * | 3/2006 | Jarrett | ................... | G06F 3/0485 715/784 |
| 2006/0290678 A1 * | 12/2006 | Lii | ...................... | G06F 3/04883 345/173 |
| 2007/0097093 A1 * | 5/2007 | Ohshita | ................. | G06F 3/0485 345/173 |

(Continued)

FOREIGN PATENT DOCUMENTS

| | | |
|---|---|---|
| CN | 102099776 | 6/2011 |
| CN | 102193723 | 9/2011 |

(Continued)

OTHER PUBLICATIONS

Across. (2014). In Collins Dictionaries, Collins English Dictionary. London, United Kingdom: Collins. Retrieved from http://search.credoreference.com/content/entry/hcengdict/across/0.*

(Continued)

*Primary Examiner* — David Choi
(74) *Attorney, Agent, or Firm* — Baker Botts L.L.P.

(57) ABSTRACT

In one embodiment, a method includes providing for display to a user content including multiple content objects that each has a boundary defining a two-dimensional area. A two-dimensional scroll region for user scrolling within the content is determined. The two-dimensional scroll region is independent of the two-dimensional areas of the content objects. User input to scroll within the content in one or both of the two dimensions across one or more of the boundaries is received. The method includes scrolling within the content according to the user input, the scrolling being continuous across the boundaries.

17 Claims, 8 Drawing Sheets

(56) References Cited

U.S. PATENT DOCUMENTS

| | | | |
|---|---|---|---|
| 2008/0165161 A1* | 7/2008 | Platzer | G06F 1/1616 345/177 |
| 2009/0160794 A1* | 6/2009 | Lee | G06F 3/0481 345/173 |
| 2009/0262089 A1* | 10/2009 | Wang | G06F 3/04883 345/173 |
| 2009/0315740 A1* | 12/2009 | Hildreth | G06F 3/017 341/20 |
| 2010/0058241 A1* | 3/2010 | Saijo | G06F 17/3084 715/830 |
| 2010/0095240 A1* | 4/2010 | Shiplacoff | G06F 3/0483 715/784 |
| 2010/0149115 A1 | 6/2010 | Park | |
| 2010/0169824 A1* | 7/2010 | Sawai | G06F 3/0346 715/784 |
| 2010/0188344 A1* | 7/2010 | Shirakawa | G06F 3/0481 345/173 |
| 2010/0235794 A1* | 9/2010 | Ording | G06F 3/0485 715/863 |
| 2011/0025627 A1* | 2/2011 | Sakai | G06F 3/0485 345/173 |
| 2011/0047504 A1* | 2/2011 | Wienands | G06F 3/0485 715/786 |
| 2011/0074699 A1* | 3/2011 | Marr | G06F 3/0485 345/173 |
| 2011/0109635 A1* | 5/2011 | Platzer | G06F 3/0485 345/473 |
| 2011/0185321 A1* | 7/2011 | Capela | G06F 3/0488 715/863 |
| 2011/0193939 A1* | 8/2011 | Vassigh | G06F 3/011 348/46 |
| 2011/0227948 A1 | 9/2011 | Ushida | |
| 2011/0252383 A1* | 10/2011 | Miyashita | G06F 3/0482 715/863 |
| 2012/0011436 A1* | 1/2012 | Jinkinson | G06F 1/1671 715/702 |
| 2012/0066638 A1* | 3/2012 | Ohri | G06F 3/04883 715/784 |
| 2012/0072863 A1* | 3/2012 | Akifusa | G06F 3/0482 715/784 |
| 2012/0092383 A1* | 4/2012 | Hysek | G04G 9/00 345/684 |
| 2012/0167003 A1* | 6/2012 | Johansson | G06F 3/04855 715/786 |
| 2013/0106744 A1* | 5/2013 | Asakura | G06F 3/04883 345/173 |
| 2013/0145292 A1* | 6/2013 | Cohen | G06Q 10/00 715/760 |
| 2013/0290116 A1* | 10/2013 | Hepworth | G06Q 30/02 705/14.73 |
| 2013/0297308 A1* | 11/2013 | Koo | G06F 3/167 704/235 |
| 2014/0149921 A1* | 5/2014 | Hauser | G06F 3/0485 715/784 |
| 2014/0149922 A1* | 5/2014 | Hauser | G06F 3/0485 715/784 |

FOREIGN PATENT DOCUMENTS

| | | |
|---|---|---|
| JP | 2005-044036 | 2/2005 |
| JP | A-2010-182029 | 8/2010 |
| JP | 2012-503223 | 2/2012 |
| WO | WO 2014/085514 | 6/2014 |

OTHER PUBLICATIONS

Across. (2011). The American Heritage Dictionary of the English language. Boston, MA: Houghton Mifflin. Retrieved from http://search.credoreference.com/content/entry/hmdictenglang/across/0.*
International Search Report and Written Opinion for International Application No. PCT/US2013/072116, dated Mar. 7, 2014.
Non-Final Office Action from U.S. Appl. No. 13/689,598, dated Sep. 15, 2015.
Response to Non-Final Office Action from U.S. Appl. No. 13/689,598, dated Dec. 8, 2015.
European Search Report from the European Patent Office for EP Patent Application No. EP 13 19 4371.4, dated Apr. 28, 2016.
Communication of Result of Substantive Examination for International Application No. MX/a2015/006860 (with English translation), dated Feb. 7, 2017.
Notification of Reasons for Rejection (translation) App. No. JP 2015-545204, dated Sep. 12, 2017.
2nd Substantive Examination Requirement for MX Application No. MX/a/2015/006860, dated Jul. 21, 2017.
Notification of the First Office Action for Application No. 2013800716636, The State Intellectual Property Office of the People's Republic of China, dated Sep. 20, 2017.

* cited by examiner

SCROLLING ACROSS BOUNDARIES IN A STRUCTURED DOCUMENT

TECHNICAL FIELD

This disclosure generally relates to mobile computing devices.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touch screens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a computing device (which may be a mobile computing device) may provide for display to a user content, and the content (e.g. a structured document) may comprise a plurality of content objects that each has a boundary defining a two-dimensional area. The computing device may determine a two-dimensional scroll region for user scrolling within the content (e.g. defined with respect to scrolling axes relative to a touch screen of a mobile computing device). The two-dimensional scroll region may be independent of the two-dimensional areas of the content objects. The computing device may receive user input to scroll within the content in one or both of the two dimensions across one or more of the boundaries. The computing device may scroll within the content according to the user input, with the scrolling being continuous across the boundaries of the content objects. The GUI may include a view port. Additionally, if the user input includes two or more gestures within, for example, a pre-determined time period, the speed of scrolling within the content may change (e.g. increase) depending, for example, on the number of gestures within the time period.

DESCRIPTION OF EXAMPLE EMBODIMENTS

Figure 1:
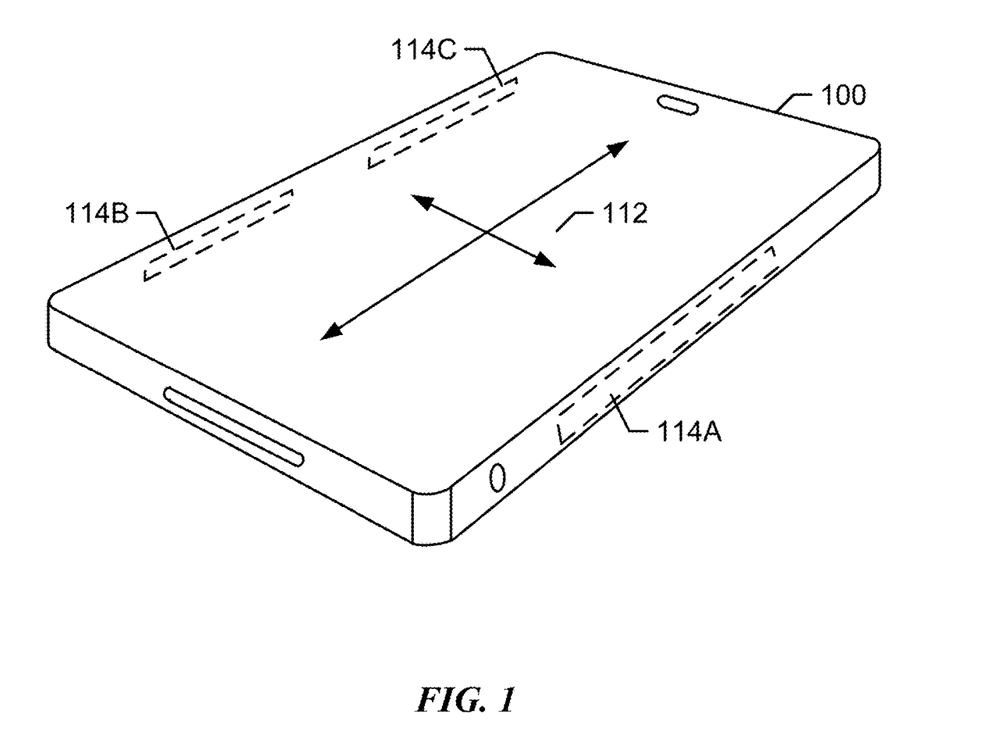
FIG. 1 illustrates an example mobile device.

FIG. 1 illustrates an example mobile device 100. This disclosure contemplates mobile device 100 taking any suitable physical form. As example and not by way of limitation, mobile device 100 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 100 may have a touch screen 112 as an input component. In the example of FIG. 1, touch screen 112 is incorporated on a front surface of mobile device 100. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 1, one or more antennae 114A-C may be incorporated into one or more sides of mobile device 100. Antennae 114A-C are components that convert electric current into radio waves, and vice versa. During transmission of signals, a transmitter applies an oscillating radio frequency (RF) electric current to terminals of antennae 114A-C, and antennae 114A-C radiate the energy of the applied the current as electromagnetic (EM) waves. During reception of signals, antennae 114A-C convert the power of an incoming EM wave into a voltage at the terminals of antennae 114A-C. The voltage may be transmitted to a receiver for amplification.

Figure 2:
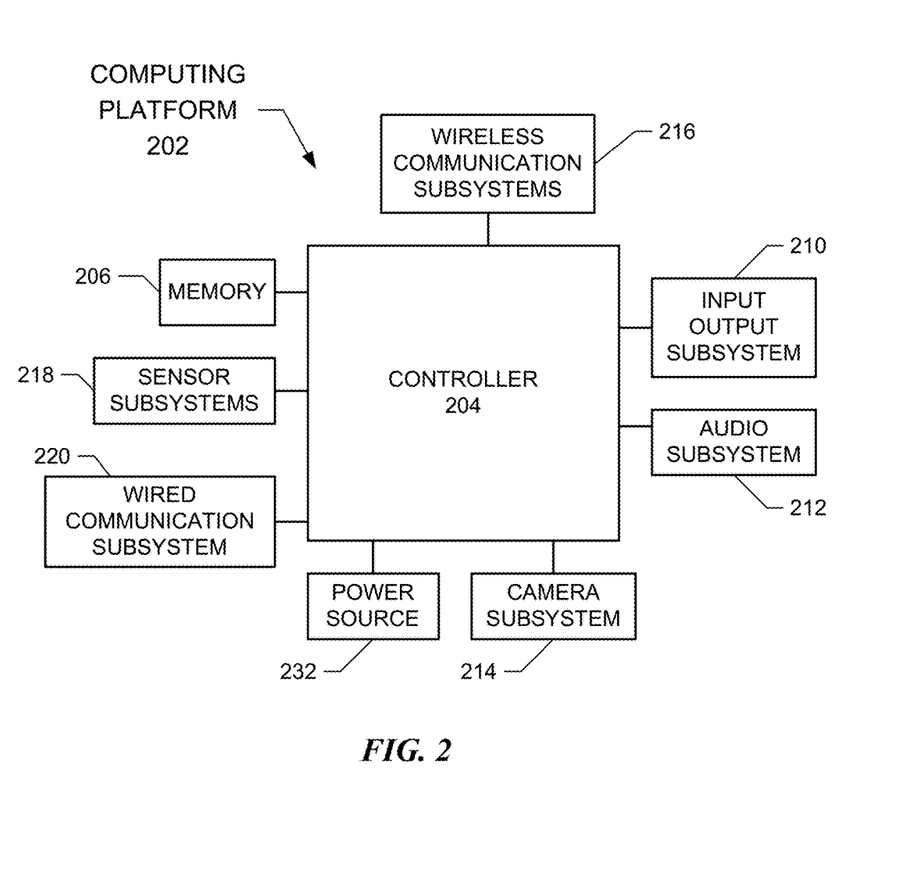
FIG. 2 illustrates an example computing platform of a mobile device.

While the mobile device 100 may be implemented in a variety of different hardware and computing systems, FIG. 2 shows a schematic representation of the main components of an example computing platform of a mobile device, according to various particular embodiments. In particular embodiments, computing platform 202 may comprise controller 204, memory 206, and input output subsystem 210. In particular embodiments, controller 204 which may comprise one or more processors and/or one or more microcontrollers configured to execute instructions and to carry out operations associated with a computing platform. In various embodiments, controller 204 may be implemented as a single-chip, multiple chips and/or other electrical components including one or more integrated circuits and printed circuit boards. Controller 204 may optionally contain a cache memory unit for temporary local storage of instructions, data, or computer addresses. By way of example, using instructions retrieved from memory, controller 204 may control the reception and manipulation of input and output data between components of computing platform 202. By way of example, controller 204 may include one or more processors or one or more controllers dedicated for certain processing tasks of computing platform 202, for example, for 2D/3D graphics processing, image processing, or video processing.

Controller 204 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 206 that is operatively coupled to controller 204.

Memory 206 may encompass one or more storage media and generally provide a place to store computer code (e.g. software and/or firmware) and data that are used by computing platform 202. By way of example, memory 206 may include various tangible computer-readable storage media including Read-Only Memory (ROM) and/or Random-Access Memory (RAM). As is well known in the art, ROM acts to transfer data and instructions uni-directionally to controller 204, and RAM is used typically to transfer data and instructions in a bi-directional manner. Memory 206 may also include one or more fixed storage devices in the form of, by way of example, hard disk drives (HDDs), solid-state drives (SSDs), flash-memory cards (e.g. Secured Digital or SD cards), among other suitable forms of memory coupled bi-directionally to controller 204. Information may also reside on one or more removable storage media loaded into or installed in computing platform 202 when needed. By way of example, any of a number of suitable memory cards (e.g. SD cards) may be loaded into computing platform 202 on a temporary or permanent basis.

Input output subsystem 210 may comprise one or more input and output devices operably connected to controller 204. For example, input output subsystem may include keyboard, mouse, one or more buttons, and/or, display (e.g. liquid crystal display (LCD), or any other suitable display technology). Generally, input devices are configured to transfer data, commands and responses from the outside world into computing platform 202. The display is generally configured to display a graphical user interface (GUI) that provides an easy to use visual interface between a user of the computing platform 202 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 210 may also include touch based devices such as touch pad and touch screen. A touch pad is an input device including a surface that detects touch-based inputs of users. Similarly, a touch screen is a display that detects the presence and location of user touch inputs. Input output system 210 may also include dual touch or multi-touch displays or touch pads that can identify the presence, location and movement of more than one touch inputs, such as two or three finger touches.

In particular embodiments, computing platform 202 may additionally comprise audio subsystem 212, camera subsystem 212, wireless communication subsystem 216, sensor subsystems 218, and/or wired communication subsystem 220, operably connected to controller 204 to facilitate various functions of computing platform 202. For example, Audio subsystem 212, including a speaker, a microphone, and a codec module configured to process audio signals, can be utilized to facilitate voice-enabled functions, such as voice recognition, voice replication, digital recording, and telephony functions. For example, camera subsystem 212, including an optical sensor (e.g. a charged coupled device (CCD), image sensor), can be utilized to facilitate camera functions, such as recording photographs and video clips. For example, wired communication subsystem 220 can include a Universal Serial Bus (USB) port for file transferring, or a Ethernet port for connection to a local area network (LAN). Additionally, computing platform 202 may be powered by power source 232.

Wireless communication subsystem 216 can be designed to operate over one or more wireless networks, for example, a wireless PAN (WPAN) (e.g. a BLUETOOTH), a WI-FI network (e.g. an 802.11a/b/g/n network), a WI-MAX network, a cellular network (such as, for example, a Global System for Mobile Communications (GSM) network, a Long Term Evolution (LTE) network). Additionally, wireless communication subsystem 216 may include hosting protocols such that computing platform 202 may be configured as a base station for other wireless devices. Other input/output devices may include an accelerometer that can be used to detect the orientation of the device.

Sensor subsystem 218 may include one or more sensor devices to provide additional input and facilitate multiple functionalities of computing platform 202. For example, sensor subsystems 218 may include GPS sensor for location positioning, altimeter for altitude positioning, motion sensor for determining orientation of a mobile device, light sensor for photographing function with camera subsystem 214, temperature sensor for measuring ambient temperature, and/or biometric sensor for security application (e.g. fingerprint reader).

In particular embodiments, various components of computing platform 202 may be operably connected together by one or more buses (including hardware and/or software). As an example and not by way of limitation, the one or more buses may include an Accelerated Graphics Port (AGP) or other graphics bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, an Advanced Microcontroller Bus Architecture (AMBA) bus, or another suitable bus or a combination of two or more of these.

In particular embodiments, mobile device 100 may include a touch pad or a touch screen 112 as an input device. A touch pad is an input device including a surface that detects touch-based inputs of users. Similarly, a touch screen is an electronic visual display surface that may detect the presence and location of user touch inputs. Touch screen 112 may be a single-touch, dual-touch, or multi-touch screen. So-called dual touch or multi-touch input devices refer to devices that may identify the presence, location and movement of more than one touch input, such as two- or three-finger touches. A system incorporating one or more touch-based input devices may monitor one or more touch-sensitive surfaces for touch or near-touch inputs from a user. When one or more such user inputs occur, the system may determine the distinct area(s) of contact and identify the nature of the touch or near-touch input(s) via, e.g. geometric features and geometric arrangements (e.g. location or movement).

The system may also determine if the inputs correspond to various touch events or gestures (e.g. tap, drag, swipe, pinch, or flick). These touch events may each correspond to certain actions to be taken by mobile device 100. For example, a flick up may correspond to the action of scrolling upward within an application displayed via touch screen 112, and a flick down may correspond to the action of scrolling downward within an application displayed via touch screen 112. A user may also have an intent conveyed via the user's touch gesture. For example, a user may know that the gesture of a flick will scroll within an application displayed via touch screen 112. The velocity of the user's gesture may indicate the user's intent with respect to, for example, the velocity associated with an animation within the graphical user interface of an application displayed by touch screen 112. The user may flick quickly, intending that the corresponding action by mobile device 100 be a quick scrolling within the application. The user may also flick slowly, intending that the corresponding action by mobile device 100 be a slow scrolling within the application.

Recognition of touch events by a system with one or more touch-based input devices—e.g. identifying one or more touch inputs by a user and determining corresponding touch event(s)—may be implemented by a combination of hardware, software, or firmware (or device drivers). One or more libraries may be used by one or more applications running on mobile device 100 to recognize touch events. For example, mobile device 100 may comprise (e.g. as part of computing platform 202) one or more device drivers communicating with one or more touch-based input devices to detect touch inputs. Mobile device 100 may comprise a touch gesture library containing touch event modules (e.g. computer code) or logic for recognizing touch inputs detected by the device drivers as touch events or gestures (e.g. tap, drag, swipe, pinch, or flick). One or more applications running on mobile device 100 may detect and process or respond to touch events or gestures by subscribing as listeners to touch event modules in the touch gesture library.

Figure 3A:
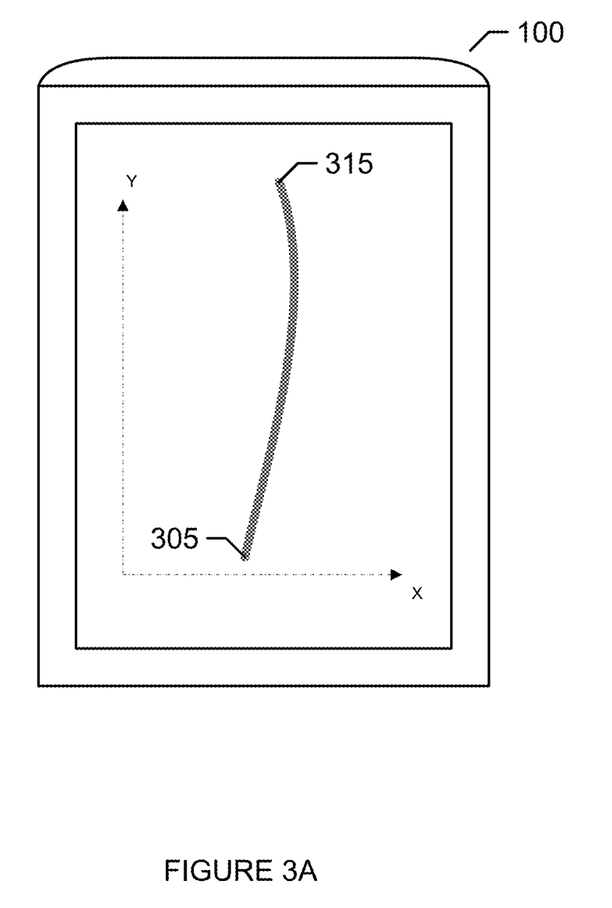
FIG. 3A illustrates an example user touch gesture.

A user may perform a touch gesture (e.g. flick up) on the surface of touch screen 112. Touch screen 112, in combination with device drivers and a touch gesture library, may allow mobile device 100 (e.g. controller 204) to determine a touch gesture based on a touch trajectory (e.g. a series of data points) of the user's touch gesture input on the surface of touch screen 112. FIG. 3A depicts an example trace of a touch gesture performed by a user on the surface of touch screen 112 of mobile device 100. In the example of FIG. 3A, a user performs a flick upward on the surface of touch screen 112. The flick gesture as performed by the user (with, e.g. a finger) begins at point 305 on touch screen 112 and ends at point 315 on touch screen 112. The flick gesture, including its starting and ending points, may be located within a two-dimensional coordinate system of points on the surface of touch screen 112, indicated by the dashed x- and y-axes in FIG. 3A.

In particular embodiments, a user of mobile device 100 may view a structured document in a graphical user interface of an application displayed by touch screen 112. A structured document such as a web page may include multiple content objects including, for example, page layout information (e.g. frames), scripts, page content such as text (e.g. ASCII or HTML), media data (e.g. images, video clips, or animations), and executable code objects (e.g. a game executable within a browser window or frame). Structured documents may be implemented with languages and technologies such as Hypertext Markup Language (HTML), Extensible Markup Language (XML), Extensible Hypertext Markup Language (XHTML), JavaScript, WebGL, Cascading Style Sheet (CSS) including CSS animations and transitions, Java, or code native to a processor of mobile device 100 running an application having a graphical user interface. A structured document may itself include references to multiple structured documents and contents. For example, a web page may include one or more inline references by incorporating Uniform Resource Locations (URLs) or script code (e.g. JavaScript, PHP, or AJAX) that, in response to a user event (e.g. a mouse click or a touch event), causes an application displaying the web page in a graphical user interface to dynamically retrieve content specified by a URL and the script code. A layout engine (or web browser engine) is a software component or library for rendering and displaying structured documents in a graphical user interface. For example, Google's Chrome web browser and Apple's Safari web browser use WebKit software to render web pages for display. WebKit includes a layout engine WebCore and a JavaScript engine JavaScriptCore (for interpreting and executing JavaScript code). An application hosted by a computing device (e.g. mobile device 100) may utilize a layout engine to render structured documents for display by incorporating modules in the layout engine via an application programming interface (API) to the layout engine.

In particular embodiments, one or more regions of a structured document that a user is currently viewing within a graphical user interface are known as a "view port." In one embodiment, a rendering or displaying process may determine a size of the view port based on a scrolling frame rate, available processing resources, or available memory resources. When a user views a structured document with a large amount of content (e.g. content objects such as text or media data) in a graphical user interface of an application (e.g. a web browser), the application may render and display only content within the view port of the graphical user interface. An application may retrieve, render, and display additional content of the structured document within the view port as the user scrolls up or down the structured document in the graphical user interface. A collection of content objects (e.g. in a structured document) may be arranged in a series. The series may be a finite collection of content objects or a potentially infinite collection of content objects (e.g., a potentially infinite number of content objects may be retrieved from a server), and the series may be ordered in any suitable manner. Content objects in a series may, in particular embodiments, be retrieved (e.g., from a server) or displayed on-demand in the view port of a graphical user interface displayed on a touch screen. In particular embodiments, it may be possible to scroll (potentially infinitely) in any direction (e.g. vertically, horizontally, diagonally, etc.) within a structured document without regard to, for example, a page height. For example, a view port may be attached anywhere within a structured document (e.g. anywhere within a potentially infinite collection or list of content objects), and scrolling may be performed between any two points in a structured document. As an example, a structured document may include content objects arranged in a series ordered by chronology. If the user scrolls vertically up within the structured document, the view port may display older content objects in the series, and if the user scrolls vertically down within the structured document, the view port may display newer content objects in the series. Additionally, an application may retrieve (and display within the view port) content objects from a server as the user scrolls up or down within the structured document. The application may, for example, insert newly-retrieved content objects into the series of content objects in the structured document at a certain position, denoted by a scroll position. As an example, newly-retrieved content objects may be placed into a structured document at scroll position 0. In this example, the other content objects in the series may be given new scroll positions (e.g., incremented by the number of newly-retrieved content objects), and the scrolling bounds of the structured document may be adjusted to include the scroll positions of all the content objects in the series (e.g., from 0 to 50). The scroll position of the view port may also be adjusted (e.g., incremented by the number of newly-retrieved content objects) in order to continue displaying the same set of content objects. As another example, newly-retrieved content objects may placed into negative scroll positions above the last (e.g., scroll position 0) content object in the series (starting, e.g., at −1 and continuing, e.g., to −2, −3, and so on), and the scrolling bounds of the structured document may be adjusted to include the newly-retrieved content objects and the other content objects in the series (e.g., from −50 to 50). The positions of the other content objects in the series need not be adjusted in this example, and therefore, the position of the view port need not be adjusted, either. In particular embodiments, the user may scroll through the content objects of a series. As an example, the user may swipe her finger across the touch screen to move forward or backward along the series. For example, to scroll forward along the series, the user may swipe her finger toward the left or in an upward motion on the touch screen. Conversely, to scroll backward along the series, the user may swipe her finger toward the right or in a downward motion on the touch screen.

Figure 3B:
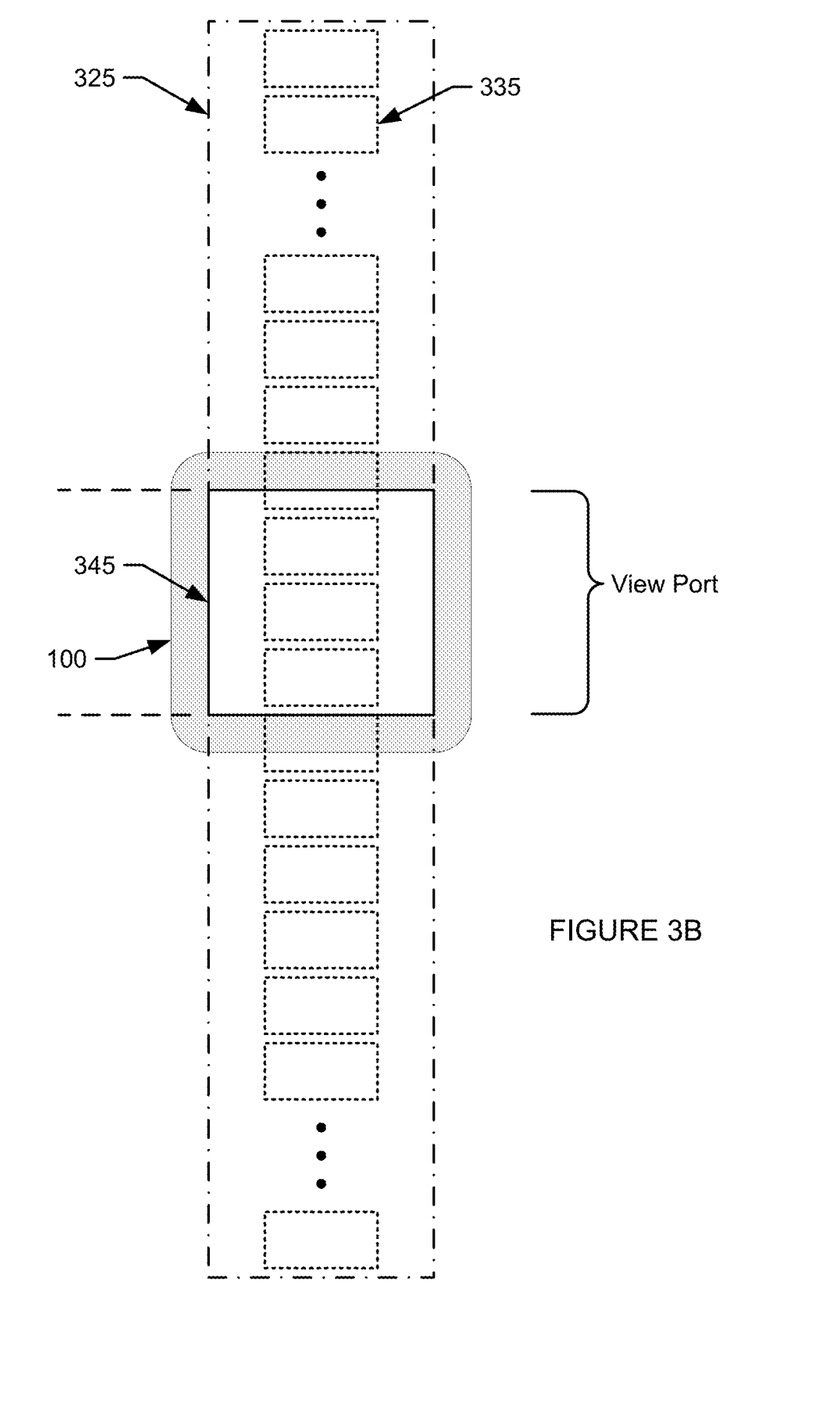
FIG. 3B illustrates an example view port of a computing device.

As discussed above, in particular embodiments, at any given time, only a portion of a collection (e.g. series) of content objects may be displayed in the view port of a graphical user interface on a screen (e.g. touch screen 112), and to view content objects not currently displayed on the screen, the user may scroll through the series of content objects. For example, the user may use a mouse or a pointing device to drag up or down a scrolling bar of the graphical user interface. As another example, the user may use a swiping gesture on a touch screen displaying the graphical user interface. One example of a series of content objects, an electronic book, may include a series of pages, and the user may scroll through these pages. At a particular time, only a few pages in the book may be displayed to the user on the screen. As another example of a series of content objects, an album may include a series of images, and the user may scroll through these images. At a particular time, only a few images in the album may be displayed to the user on the screen. Each of these content objects (e.g. in a series of content objects) may have a boundary that defines an area of the content object. This boundary may, for example, be specified by the language implementing the structured document containing the content object (e.g. Javascript). As an example, a page of a book or an image in an album may have a boundary that defines a two-dimensional area (e.g. within the graphical user interface of an application displayed on touch screen 112). FIG. 3B illustrates an example structured document 325 such as a web page. Structured document 325 may comprise a plurality of content objects 335, but in the example of FIG. 3B, only a portion of the content objects is displayed within view port 345 of a graphical user interface of an application hosted by a computing device, e.g. mobile device 100. The example of FIG. 3B also illustrates that content objects 335 may be smaller than the size of the view port 345. Although not illustrated in the example of FIG. 3B, it is contemplated in this disclosure that structured document 325 may be larger than, smaller than, or the same size as view port 345. Additionally, although the example of FIG. 3B illustrates a structured document having a series of content objects arranged vertically, this disclosure contemplates any suitable arrangement of content objects, including a horizontal arrangement or a tiled arrangement of content objects. [28] In particular embodiments, the structured document (or other item displayed by the graphical user interface) may be scrollable within a two-dimensional area or region defined by scrolling axes relative to the display. For example, as illustrated in FIG. 3A, the scrolling axes may be horizontal (labeled as "X") and vertical (labeled as "Y") axes defined with respect to the display of touch screen 112, and a user may scroll in any direction (e.g. diagonally or non-linearly) within the two-dimensional area or region defined by the horizontal and vertical scrolling axes. If, for example, the display of touch screen 112 is rotatable or otherwise changeable, the scrolling axes defined with respect to the display may also change. As illustrated in FIG. 3B, one or more entire content objects 335 or portions of content objects 335 may be visible in view port 345. By scrolling (e.g. by using a touch gesture such as a swipe upward, downward, to the left or right, or in any other direction on the surface of touch screen 112), the one or more content objects in the view port may recede from view and adjacent content objects (e.g. whole content objects or portions of content objects) may simultaneously and seamlessly scroll into view. In particular embodiments, the view port may display only one content object 335 at a time, and when a user scrolls, the user discretely pages through content objects, often referred to as paginated scrolling. For example, when a user scrolls, the one content object in the view port may recede from view, and an adjacent content object (e.g. horizontally, vertically, or diagonally adjacent) may simultaneously scroll into view. When a pre-determined amount of the adjacent content object 335 (e.g. 50%, as defined by the boundaries of the adjacent content object) has moved into the view port, the adjacent content object 335 may then automatically "snap" into place, becoming the only content object displayed in the view port. In yet other embodiments, including the embodiment illustrated by FIG. 3B, a user may free scroll through content objects. For example, the view port may display multiple content objects or portions of content objects 335, and when a user scrolls, the scrolling may be continuous across the boundaries of one or more content objects 335 (e.g. scrolling independent of content object boundaries and without changing scrolling behavior at a boundary or "snapping" into place once a boundary is crossed). For example, the scrolling may animate to a stopping point in such a manner that view port 345 may contain one or more content objects 335 or portions of content objects 335. In yet other embodiments, a combination of paginated scrolling and free scrolling may be used. As an example, if view port 345 displays a single content object 335, the user may free scroll within the content object 335, and once the user reaches a boundary of the content object, the scrolling may switch to paginated scrolling, such that another content object (e.g. an adjacent content object) then enters the view port. At this point, scrolling may once again be free scrolling within the boundaries of the currently displayed content object.

In particular embodiments, the velocity of a user's touch gesture may affect scrolling behavior within a structured document (or other content) displayed via a graphical user interface of an application. For example, the vector or path of a user's touch gesture input (or its speed) may be used to ascertain whether a user wishes to browse adjacent content objects or content objects that are further away within the structured document. For example, if a user is swiping to scroll through a series of photos in an album, the velocity of the user's touch gesture may determine whether the scrolling advances to an adjacent photo (e.g. if the velocity is relatively low) or whether the scrolling advances multiple photos (e.g. if the velocity is relatively high). As an example, if a user, in a relatively short amount of time, swipes a relatively large distance, it may be determined that the velocity of the touch gesture is relatively high, and multiple content objects may be advanced by scrolling. Additionally, the velocity of a user's gesture may also be used to determine whether scrolling is paginated scrolling (e.g. if velocity is relatively low) or continuous or free scrolling (e.g. if velocity is relatively high). In yet other embodiments, if a user performs more than a certain number of touch gestures in a given time period (e.g. more than two swipes within two seconds), the speed of scrolling within the structured document may increase with each additional swipe in the time period by, for example, a multiplicative factor. For example, the third swipe within two seconds may have a scrolling speed (e.g. as animated by a layout engine) that is 1.2 times faster than the scrolling speed of the second swipe. Additionally, the fourth swipe within two seconds may have a scrolling speed that is 1.4 times faster than the scrolling speed of the second swipe. In particular embodiments, scrolling may be paused or halted at any point during navigation within a structured document. For example, a user who scrolls between pages by swiping a finger across touch screen 112 may interrupt the scrolling and "freeze" the display in place by interrupting the swiping motion and holding her finger in place. Additionally, a user may interrupt scrolling and switch the scrolling direction by swiping in the opposite direction during an in-progress scroll.

Figure 3C:
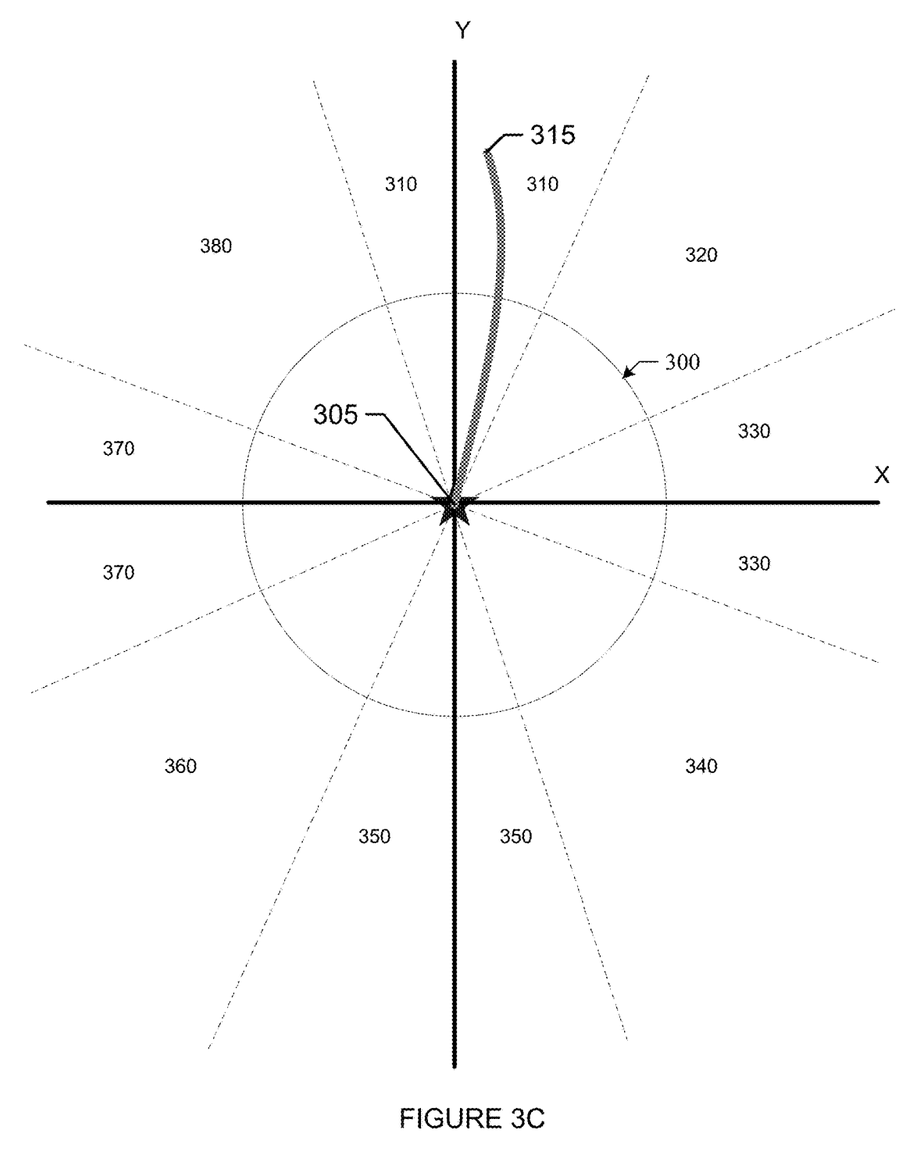
FIG. 3C illustrates example regions of a display of a computing device.

In particular embodiments, a user's touch gesture for scrolling may be used to determine whether to engage a clamping behavior in scrolling. For example, if a user is attempting to scroll up within a document but makes a scrolling gesture (e.g. a swipe) that is not perfectly vertical, without clamping, the document may be scrolled in a diagonal fashion rather than a vertical fashion. It may, in particular embodiments, be desirable to "clamp" the scrolling behavior to be solely vertical (or, similarly, solely horizontal) to better match a user's intent. In the example of FIG. 3A, a user's touch gesture path for vertical scrolling on touch screen 112 is illustrated. FIG. 3C illustrates the same touch gesture path. The center star shape in FIG. 3C illustrates the starting point 305 of the touch gesture path, and the end point of the path is illustrated by end point 315. As discussed above, even though the user may desire to scroll solely vertically, the touch gesture path of the user is not purely vertical. Clamping of the scrolling behavior may be done based on the user's touch gesture path. Touch screen 112 may be divided into any suitable number of regions (e.g., the eight regions 310-380 in FIG. 3C). Additionally, the regions may be equal in size or angular span or, alternatively, unequal in size or angular span. These regions may be defined with respect to the starting point of the touch gesture and scrolling axes of the display. For example, the regions may each be defined by one or more angles measured from the vertical (e.g. "Y") or horizontal (e.g. "X") scrolling axes relative to the display of touch screen 112. In FIG. 3C, region 330 of the touch screen display may be defined as including all points on the touch screen that are between 22.5 degrees above the horizontal scrolling axis and 22.5 degrees below the horizontal scrolling axis running through the starting point 305. Additionally, region 310 of the touch screen display may be defined as including all points on the touch screen that are between 67.5 degrees above the horizontal scrolling axis and 112.5 degrees above the horizontal scrolling axis. In the example of FIG. 3C, regions 310 and 350 correspond to the vertical scrolling axis, and regions 330 and 370 correspond to the horizontal scrolling axis. Regions 320, 340, 360, and 380 do not correspond to either scrolling axis. Circle 300 in FIG. 3C denotes a pre-determined length from starting point 305. In particular embodiments, the regions of interest are not only defined by angles (as described above), but must also fall within circle 300. Thus, in this example, the regions of interest would be sectors of circle 300. It should be noted that although the example of FIG. 3C illustrates eight regions defined by equally-sized angular spans, the regions may be defined in any suitable manner with respect to starting point 305. In particular embodiments, the region (or regions) of touch screen 112 that correspond to (or contain) at least a portion of the path of the user's touch gesture are determined. In the example of FIG. 3C, region 310 completely contains the path of the user's touch gesture for scrolling. Because region 310 corresponds to the vertical scrolling axis, the scrolling behavior may be "clamped" to scroll only vertically up (e.g. linearly and parallel to the vertical "Y" scrolling axis). Similarly, if region 350 contained all or a portion of the path of the user's touch gesture for scrolling, the scrolling behavior may be clamped to scroll only vertically down. In particular embodiments, only the vertical component of the user's touch gesture path is used in creating the vertically clamped scrolling behavior. If regions 330 or 370 contained all or a portion of the path of the user's touch gesture for scrolling, the scrolling behavior may be clamped to scroll only horizontally (either to the right or left, respectively). In particular embodiments, only the horizontal component of the user's touch gesture path is used in creating the horizontally clamped scrolling behavior. Finally, if the path of the user's touch gesture falls within regions 320, 340, 360, or 380, the scrolling behavior may not be clamped to either scrolling axis, and may, for example, be a free scroll within the structured document.

In particular embodiments, once clamping has begun, (based, for example, on a first touch gesture for scrolling vertically downward) clamping behavior in scrolling may persist for a pre-determined amount of time (e.g. one second). Thus, for example, if a user makes a second touch gesture for scrolling downward before the clamping timer ends (e.g. before one second expires), but this second gesture path falls in region 340 (determined with respect to the second starting point), the scrolling may continue to be clamped vertically downward until expiry of the clamping timer. In this example, the vertical component of the second gesture path (which falls in region 340) may be used to create the vertically clamped scrolling behavior. As another example, if after vertical clamping has begun (e.g., based on a first touch gesture for scrolling vertically downward), the user makes a second touch gesture for scrolling horizontally before the clamping timer ends, and this second gesture path falls in region 330 (determined with respect to the second starting point), the scrolling may continue to be clamped vertically downward until expiry of the clamping timer. In this example, the vertical component of the second gesture path (which falls in region 330) may be used to create the vertically clamped scrolling behavior. As yet another example, if after vertical clamping has begun (e.g., based on a first touch gesture for scrolling vertically downward), the user makes a second touch gesture for scrolling vertically before the clamping timer ends, and this second gesture path falls in region 310 (determined with respect to the second starting point), the scrolling may continue to be clamped vertically, but may be clamped vertically upward instead, until expiry of the clamping timer. In this example, the vertical component of the second gesture path (which falls in region 310) may be used to create the vertically upward clamped scrolling behavior. In these examples, clamping is done per-axis and not per-region. It will be understood that although the above examples illustrate vertical clamping (either downward or upward), horizontal clamping behavior (e.g., either to the left or to the right), once begun, may also persist for a predetermined amount of time. After the expiry of a clamping timer, any new touch gestures for scrolling may be evaluated to determine whether to begin clamping behavior once again. In addition to the expiry of a clamping timer, clamping behavior may be ended if the user holds on (e.g., keeps a finger or stylus on) touch screen 112 for a predetermined amount of time without initiating a new gesture. Clamping behavior may also be ended if the entire action or behavior from a previous user gesture is terminated (e.g., an animation for the previous gesture has completely stopped).

In particular embodiments, users of a scroll library (e.g. in Javascript) may specify how scrolling behaviors map to a user experience within, for example, a graphical user interface. As an example, typical scrolling actions (e.g. a swipe upward or pressing the up button on a scroll bar) may be reconfigured so that an element in view port 345 is rotated or translated but no scrolling occurs. Similarly, a scroll bar may be used to control any of a number of different properties viewed via a graphical user interface including, for example, image saturation or image hue.

Figure 4A:
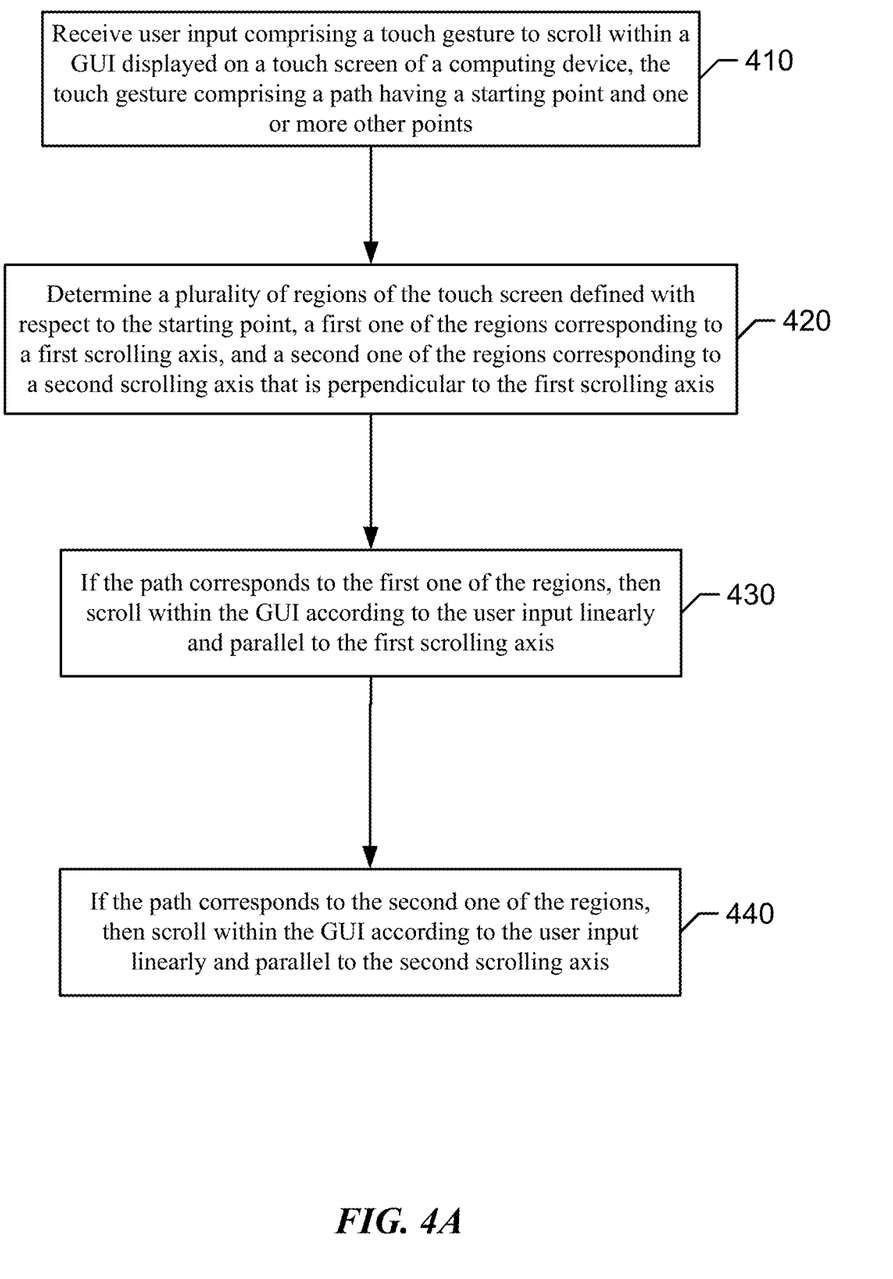
FIG. 4A illustrates an example method for clamping scrolling behavior.

FIG. 4A illustrates an example method for clamping scrolling behavior. At step 410, a computing device (e.g. mobile device 100) receives user input to scroll within a graphical user interface (GUI) displayed on a touch screen (e.g. touch screen 112) of the computing device. The user input comprises a touch gesture on the touch screen, and the touch gesture comprises a path that has a starting point and one or more other points (e.g. an ending point and points in-between) on the touch screen. At step 420, the computing device determines a plurality of regions of the touch screen defined with respect to the starting point. A first one of the regions corresponds to a first scrolling axis (e.g. a horizontal axis), and a second one of the regions corresponds to a second scrolling axis that is perpendicular to the first scrolling axis (e.g. a vertical axis). At step 430, if the path corresponds to the first one of the regions, then the computing device scrolls within the GUI according to the user input linearly and parallel to the first scrolling axis. At step 440, if the path corresponds to the second one of the regions, then the computing device scrolls within the GUI according to the user input linearly and parallel to the second scrolling axis. Particular embodiments may repeat one or more steps of the method of FIG. 4A, where appropriate. Although this disclosure describes and illustrates particular steps of the method of FIG. 4A as occurring in a particular order, this disclosure contemplates any suitable steps of the method of FIG. 4A occurring in any suitable order. Moreover, although this disclosure describes and illustrates particular components, devices, or systems carrying out particular steps of the method of FIG. 4A, this disclosure contemplates any suitable combination of any suitable components, devices, or systems carrying out any suitable steps of the method of FIG. 4A.

Figure 4B:
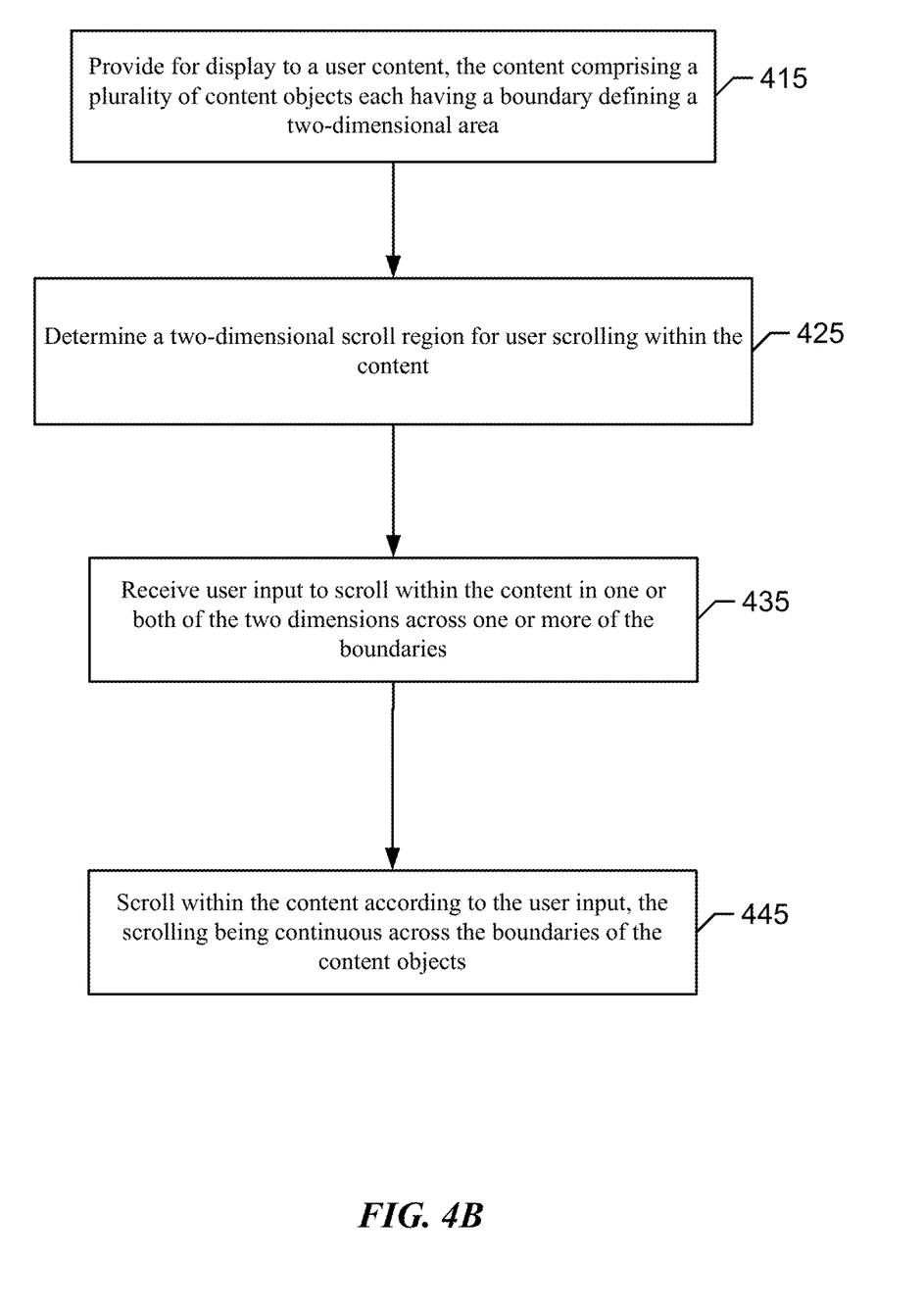
FIG. 4B illustrates an example method for scrolling independent of content object boundaries.

FIG. 4B illustrates an example method for scrolling independent of content object boundaries. At step 415, a computing device (e.g. mobile device 100) provides for display to a user content, and the content (e.g. a structured document) comprises a plurality of content objects that each has a boundary defining a two-dimensional area. At step 425, the computing device determines a two-dimensional scroll region for user scrolling within the content (e.g. defined with respect to scrolling axes relative to touch screen 112). The two-dimensional scroll region is independent of the two-dimensional areas of the content objects. At step 435, the computing device receives user input to scroll within the content in one or both of the two dimensions across one or more of the boundaries. At step 445, the computing device scrolls within the content according to the user input, with the scrolling being continuous across the boundaries of the content objects. Particular embodiments may repeat one or more steps of the method of FIG. 4B, where appropriate. Although this disclosure describes and illustrates particular steps of the method of FIG. 4B as occurring in a particular order, this disclosure contemplates any suitable steps of the method of FIG. 4B occurring in any suitable order. Moreover, although this disclosure describes and illustrates particular components, devices, or systems carrying out particular steps of the method of FIG. 4B, this disclosure contemplates any suitable combination of any suitable components, devices, or systems carrying out any suitable steps of the method of FIG. 4B.

Figure 5:
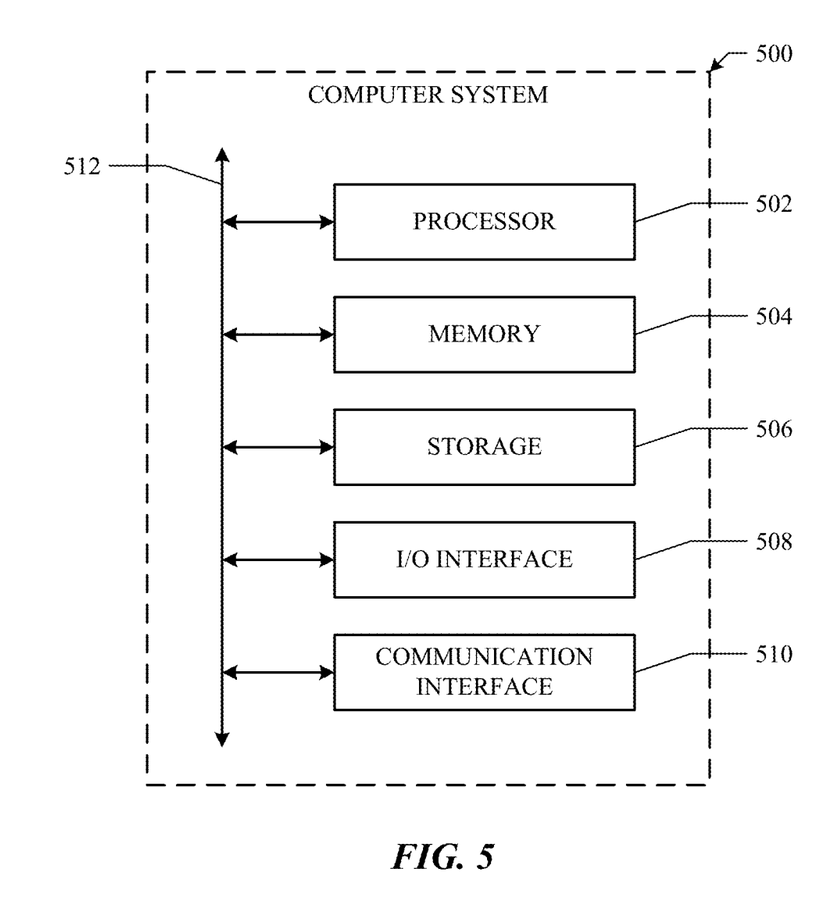
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, displaying, to a user, one or more of a plurality of content objects each having a boundary defining a two-dimensional area, wherein at least a portion of each of the displayed content objects appears in a view port of a graphical user interface displayed on a screen of the computing device;
   by the computing device, determining a two-dimensional scroll region for user scrolling within the view port, the two-dimensional scroll region being independent of the boundaries of the displayed content objects and comprising a first region associated with a first scrolling axis and a second region associated with a second scrolling axis that is perpendicular to the first scrolling axis;
   by the computing device, receiving a first touch gesture to scroll within the content objects and across one or more of the boundaries, wherein the first touch gesture comprises a motion along a first path, wherein the first path is within the first region associated with the first scrolling axis;
   by the computing device, upon receiving the first touch gesture, scrolling the displayed content objects in a first direction parallel to the first scrolling axis, wherein the scrolling the displayed content objects is clamped in the first direction for a threshold time period;
   by the computing device, receiving a second touch gesture to scroll within the content objects, wherein the second touch gesture comprises a motion along a second path beyond the first region, wherein the second path comprising a first directional component parallel to the first scrolling axis and a second directional component perpendicular to the first directional component;
   by the computing device, when the second touch gesture is received within the threshold time period, scrolling the displayed content objects through the view port corresponding to the first directional component of the second path, wherein the scrolling the displayed content objects through the view port occurs linearly and is clamped by the first gesture to be parallel to the first direction which is parallel to the first scrolling axis; and
   by the computing device, when the second touch gesture is received beyond the threshold time period, scrolling the displayed content objects through the view port in a second direction determined by the second path of the second touch gesture.

2. The method of claim 1, wherein the first touch gesture comprises two or more touch inputs within a pre-determined time period.

3. The method of claim 2, wherein scrolling through the view port is based at least in part on the two or more touch inputs and the pre-determined time period.

4. The method of claim 3, wherein a scrolling speed is based at least in part on the two or more touch inputs, the pre-determined time period, and a multiplicative factor, wherein the multiplicative factor increases based at least in part on a number of the two or more touch inputs in the pre-determined time period.

5. A system comprising:
   one or more processors; and
   a memory coupled to the processors comprising instructions executable by the processors, the processors operable when executing the instructions to:
      display, to a user, one or more of a plurality of content objects each having a boundary defining a two-dimensional area, wherein at least a portion of each of the displayed content objects appears in a view port of a graphical user interface displayed on a screen of the computing device;
      determine a two-dimensional scroll region for user scrolling within the view port, the two-dimensional scroll region being independent of the boundaries of the displayed content objects and comprising a first region associated with a first scrolling axis and a second region associated with a second scrolling axis that is perpendicular to the first scrolling axis;
      receive a first touch gesture to scroll within the content objects and across one or more of the boundaries, wherein the first touch gesture comprises a motion along a first path, wherein the first path is within the first region associated with the first scrolling axis;

upon receiving the first touch gesture, scroll the displayed content objects in a first direction parallel to the first scrolling axis, wherein the displayed content objects scroll and are clamped in the first direction for a threshold time period;

receive a second touch gesture to scroll within the content objects, wherein the second touch gesture comprises a motion along a second path beyond the first region, wherein the second path comprises a first directional component parallel to the first scrolling axis and a second directional component perpendicular to the first directional component;

when the second touch gesture is received within the threshold time period, scroll the displayed content objects through the view port corresponding to the first directional component of the second path, wherein the displayed content objects scroll through the view port linearly and are clamped by the first gesture to be parallel to the first direction which is parallel to the first scrolling axis; and when the second touch gesture is received beyond the threshold time period, scroll the displayed content objects through the view port in a second direction determined by the second path of the second touch gesture.

6. The system of claim 5, wherein the first touch gesture comprises two or more touch inputs within a pre-determined time period.

7. The system of claim 6, wherein the displayed content objects scroll through the view port based at least in part on the two or more touch inputs and the pre-determined time period.

8. The system of claim 7, wherein a scrolling speed is based at least in part on the two or more touch inputs, the pre-determined time period, and a multiplicative factor, wherein the multiplicative factor increases based at least in part on a number of the two or more touch inputs in the pre-determined time period.

9. One or more computer-readable non-transitory storage media embodying software that is operable when executed to:

display, to a user, one or more of a plurality of content objects each having a boundary defining a two-dimensional area, wherein at least a portion of each of the displayed content objects appears in a view port of a graphical user interface displayed on a screen of the computing device;

determine a two-dimensional scroll region for user scrolling within the view port, the two-dimensional scroll region being independent of the boundaries of the displayed content objects and comprising a first region associated with a first scrolling axis and a second region associated with a second scrolling axis that is perpendicular to the first scrolling axis;

receive a first touch gesture to scroll within the content objects and across one or more of the boundaries, wherein the first touch gesture comprises a motion along a first path, wherein the first path is within the first region associated with the first scrolling axis;

upon receiving the first touch gesture, scroll the displayed content objects in a first direction parallel to the first scrolling axis, wherein the displayed content objects scroll and are clamped in the first direction for a threshold time period;

receive a second touch gesture to scroll within the content objects, wherein the second touch gesture comprises a motion along a second path beyond the first region, wherein the second path comprising a first directional component parallel to the first scrolling axis and a second directional component perpendicular to the first directional component;

when the second touch gesture is received within the threshold time period, scroll the displayed content objects through the view port corresponding to the first directional component of the second path, wherein the displayed content objects scroll through the view port linearly and are clamped by the first gesture to be parallel to the first direction which is parallel to the first scrolling axis; and when the second touch gesture is received beyond the threshold time period, scroll the displayed content objects through the view port in a second direction determined by the second path of the second touch gesture.

10. The media of claim 9, wherein the first touch gesture comprises two or more touch inputs within a pre-determined time period.

11. The media of claim 10, wherein the display content objects scroll through the view port based at least in part on the two or more touch inputs and the pre-determined time period.

12. The media of claim 11, wherein a scrolling speed is based at least in part on the two or more touch inputs, the pre-determined time period, and a multiplicative factor, wherein the multiplicative factor increases based at least in part on a number of the two or more touch inputs in the pre-determined time period.

13. The method of claim 1, further comprising software that is operable when executed to retrieve additional content objects.

14. The method of claim 13, wherein the additional content objects are retrieved from a server.

15. The method of claim 13, wherein the additional content objects are retrieved in response to receiving the first touch gesture.

16. The method of claim 13, further comprising software that is operable when executed to display one or more of the additional content objects as scrolling through the view port in accordance with the scrolling speed.

17. The method of claim 1, wherein:
if a velocity of the first touch gesture is greater than or equal to a threshold velocity, then the scrolling the displayed content objects through the view port comprises scrolling the displayed content objects continuously through the view port;
else the scrolling the displayed content objects through the view port comprises scrolling the displayed content objects through the view port in a paginated fashion, wherein when a pre-determined amount of an adjacent content object is displayed in the view port, the adjacent content object is snapped into view.

* * * * *